United States Patent [19]

Lyon

[11] 3,956,622

[45] May 11, 1976

[54] TWO'S COMPLEMENT PIPELINE MULTIPLIER

[75] Inventor: Richard Francis Lyon, Stanford, Calif.

[73] Assignee: Bell Telephone Laboratories, Incorporated, Murray Hill, N.J.

[22] Filed: Dec. 20, 1974

[21] Appl. No.: 534,765

[52] U.S. Cl. .............................................. 235/164
[51] Int. Cl.² ......................................... G06F 7/54
[58] Field of Search ........................... 235/156, 164

[56] References Cited
UNITED STATES PATENTS

| | | | |
|---|---|---|---|
| 3,582,634 | 6/1971 | Bartlett | 235/164 |
| 3,627,999 | 12/1971 | Iverson | 235/164 |
| 3,737,638 | 6/1973 | Esteban | 235/164 |
| 3,761,699 | 9/1973 | Sather | 235/164 X |
| 3,805,043 | 4/1974 | Clary | 235/164 |

OTHER PUBLICATIONS

L. B. Jackson et al., "An Approach to the Implementation of Digital Filters" IEEE Trans. on Audio & Electroacoustics, Vol. AU-16, No. 3, 9-1968, pp. 413-421.

Digital Computer Design Fundamentals, Published 1962, pp. 444-447.

*Primary Examiner*—Malcolm A. Morrison
*Assistant Examiner*—Jerry Smith
*Attorney, Agent, or Firm*—R. A. Ryan

[57] ABSTRACT

The present invention includes a substantially modular pipeline multiplier for directly forming the correct final product of a 2's complement data word and a sign and magnitude coefficient word. In particular, the present invention includes circuitry for inserting logic 1 signals into the computations as sign extensions during multiplication whenever the data word is a negative 2's complement number.

4 Claims, 5 Drawing Figures

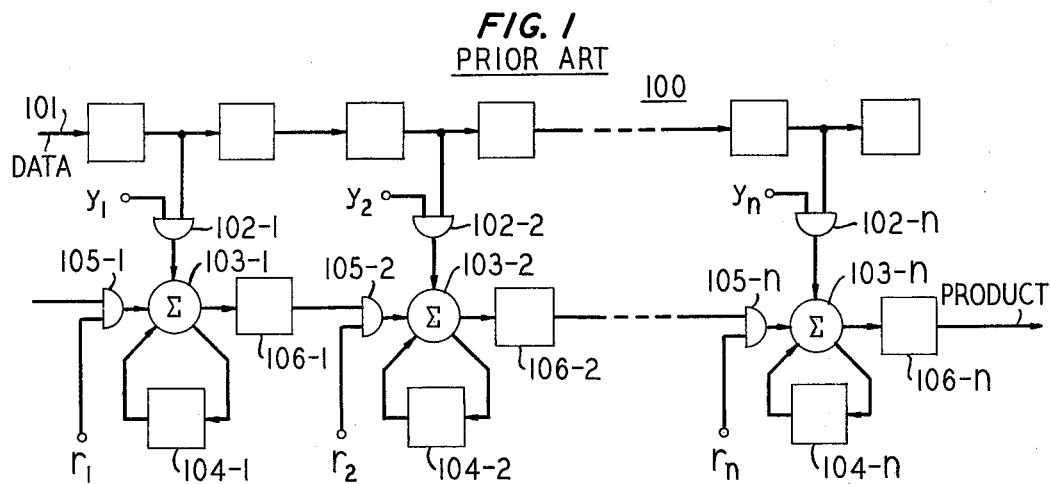

TWO'S COMPLEMENT PIPELINE MULTIPLIER

FIELD OF THE INVENTION

This invention relates to digital data processing apparatus. More particularly, the present invention relates to apparatus and methods for generating digital signals representative of the product of digital signals representing a multiplier (coefficient word) and a multiplicand (data word). Still more particularly, the present invention relates to serial multiplier apparatus for directly generating the correct 2's complement product of a 2's complement data word and a sign and magnitude coefficient word.

BACKGROUND OF THE INVENTION

There are many applications in data processing which require the formation of a product signal. The data processing arts are replete with multiplication circuits and methods which are particularly adaptable for use in various of these contexts. Thus, for example, there are multiplier circuits which are particularly well adapted for performing the multiplication of data signals from each of two serial data streams. In other applications, however, it is necessary to form the product of signals, one of which is presented in a serial data stream and the other of which is presented in parallel form. Such circuits are used in digital filtering, as described, for example, in Jackson et al, "An Approach to the Implementation of Digital Filters," IEEE Transactions on Audio and Electroacoustics, Vol. AU-16, No. 3, September, 1968.

In general, it has been found convenient in systems including serial adders to represent operands applied to such systems in 2's complement form. However, the properties of 2's complement numbers are such that prior art serial multipliers cannot conveniently process operands in that form. Systems, then, which include both serial adders and serial multipliers, such as digital filters, have been necessarily more complex to permit the multiplication of operands in 2's complement form. It is therefore an object of the present invention to provide a simplified multiplier for processing serial operands in 2's complement form.

It is also of concern that serial multipliers of the type considered herein be substantially modular in order to permit their construction by economical batch fabrication techniques. Prior art multipliers for processing serial 2's complement data typically require significant modifications which adversely affect their modularity and, hence, the economics of their manufacture. It is therefore an object of the present invention to provide serial multipliers for processing 2's complement numbers which multipliers are substantially modular.

SUMMARY OF THE INVENTION

The above and other objects are achieved in accordance with an illustrative embodiment of the present invention in which a substantially modular pipeline multiplier forms the correct final product of a 2's complement data word having a single bit of sign extension and a sign and magnitude coefficient word.

In particular, it is a feature of the present invention that circuitry is provided for selectively inserting logic 1 signals into the computations as sign extensions during multiplication whenever the data word is a negative 2's complement number.

BRIEF DESCRIPTION OF THE DRAWING

These and other objects, features and advantages of the present invention will become more apparent upon a consideration of the following detailed description when read in connection with the attached drawing wherein:

FIG. 1 shows a prior art pipeline multiplier for multiplying sign and magnitude data and coefficient words;

FIGS. 2A and 2B illustrate the arithmetic operations involved in the formation of partial and final product terms in the multiplication of a negative data word by a positive coefficient word and a negative data word by a negative coefficient word, respectively;

DETAILED DESCRIPTION

Figure 3:
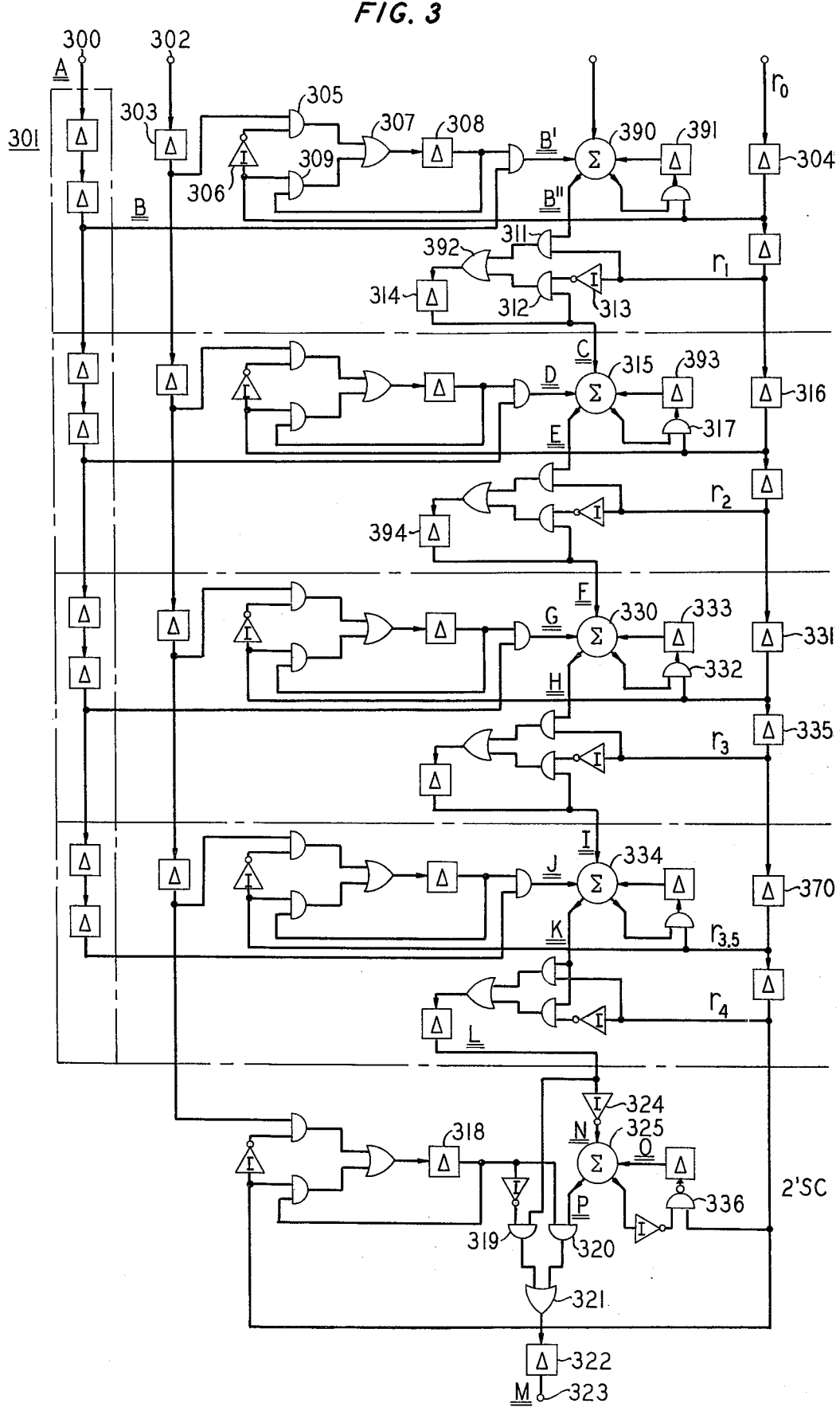
FIG. 3 illustrates a multiplier in accordance with the principles of the present invention for forming the correct final products of the muliplications illustrated in FIGS. 2A and 2B.

It is a well-known characteristic of the 2's complement form of representing numbers that the formation of products involving negative operands produces incorrect results. To illustrate this fact and in order to better understand the operation of the present invention, consider the following problem involving the multiplication of a negative 2's complement data word, $-8_{10}$, by a positive sign and magnitude coefficient word, $(+1\frac{7}{8})_{10}$.

|   |   |   |   | SB | MSB |   |   | LSB |   |
|---|---|---|---|----|----|---|---|---|---|
|   |   |   |   | 1  | 1  | 0 | 0 | 0 | (data) |
|   |   |   |   | SB |    |   |   |   |   |
|   |   |   |   | 0  | 1  . | 1 | 1 | 1 | (coefficient) |
|   |   |   |   | 1  | 1  | 0 | 0 | 0 |   |
|   |   |   | 1 | 1  | 0  | 0 | 0 |   |   |
|   |   | 1 | 1 | 0  | 0  | 0 |   |   |   |
|   | 1 | 1 | 0 | 0  | 0  |   |   |   |   |
| 1 | 0 | 1 | 1 | 0  | 1 . | 0 | 0 | 0 |   |

The result is, of course, incorrect. The correct product, however, may be obtained by "extending" the data sign bit to include a number of digits equal to the number of digits in the multiplier. To illustrate, consider the above example rewritten with the data sign bit extended.

|   |   |   |   | SB | MSB |   |   |   |   |
|---|---|---|---|----|----|---|---|---|---|
| 1 | 1 | 1 | 1 | 1  | 1  | 0 | 0 | 0 | (data) |
|   |   |   |   | 0  | 1  . | 1 | 1 | 1 | (coefficient) |
| 1 | 1 | 1 | 1 | 1  | 1  | 0 | 0 | 0 |   |
| 1 | 1 | 1 | 1 | 1  | 0  | 0 | 0 |   |   |
| 1 | 1 | 1 | 1 | 0  | 0  | 0 |   |   |   |
| 1 | 1 | 0 | 0 | 0  | 1 . | 0 | 0 | 0 |   |

The portions of the partial product terms to the left of the "staircase" (known collectively as the sign extension array) are those contributed by the sign extension. In each case, carries beyond the sign bit of the uncorrected product are ignored. it is the inclusion of these correction factors which gives rise to the final correct product.

Consider, now, FIG. 1, which shows an n-stage modular pipeline multiplier for generating the product of a sign and magnitude data word and a sign and magnitude coefficient word. Multipliers like that of FIG. 1 are well known in the art and are described, for example, in the above-cited article by Jackson et al. In accordance with the circuit of FIG. 1, the data word is applied, LSB first, to the shift register 100 by means of input lead 101. Simultaneously, the coefficient word $Y_1$ $Y_2 \ldots Y_n$, where $Y_1$ is the LSB, is applied to the AND gates 102-$i$, $i = 1, 2 \ldots n$. As the data bits are shifted through the shift register stages, each section of the multiplier generates one partial product term by ANDing one data word bit with the coefficient word bit associated with that section and adding the result to the accumulation of partial products from the preceding stages. The adders 103-$i$ add the partial products generated at the appropriate section to the accumulated sum from the preceding stages. Carry flip-flops 104-$i$ store the carry terms generated during the additions performed by the adders 103-$i$.

The multiplier of FIG. 1 also includes AND gates 105-$i$ for gating to 0 low order partial product terms to maintain the number of terms in the final product equal to the number of terms in the data word. Thus, the signals $r_i$ are applied to AND gates 105-$i$ simultaneously with the lower order partial product terms to be truncated. Delay flip-flops (or 1-bit shift registers) 106-$i$ provide appropriate delays as required for proper operation of the circuit.

The prior art circuit of FIG. 1 is arranged to form the product of two positive unsigned numbers, only. The circuit of the present invention, as has been emphasized, forms the product of a 2's complement data word (positive or negative) and a sign and magnitude coefficient word.

It is considered that the details of operation of the preferred embodiment of the present invention can be best understood by way of illustration. Consider then, FIG. 2A which shows the formation of partial and final products in the multiplication of a negative data word, $(-7)_{10}$, by a positive coefficient word, $(1⅜)_{10}$, in accordance with the precepts of the present invention. FIG. 2B illustrates the formation of the product of the negative data word, $-7$, by the negative coefficient word, $-1⅜$, and will be discussed in more detail below. Notice that the extension of the sign bit of the data word by only a single bit position is at variance with the practice described above relating to the formation of correct products by extension of the sign bit through a number of positions equal to the number of digits in the coefficient word. As will become clear from the following discussion, the single bit of sign extension is sufficient in combination with the circuit of the present invention to produce the correct product of the multiplication illustrated in FIGS. 2A and 2B. The single sign extension bit is the bit labelled "SE" in FIGS. 2A and 2B. The bits labeled "SB" and "MSB" are the sign bit and most significant bit of the data word, respectively. In addition, the three low-order bits in the partial product rows, shown with a diagonal line through them, are truncated bits. As in the circuit of FIG. 1, truncation is ncessary to insure that the product word has the same maximum number of digits as the input data word. Further, three partial product bits deriving from sign extension bits and circled in FIGS. 2A and 2B, have been included in the partial product rows. The significance of these bits will be discussed in more detail below, as will the circled letters at the right of FIGS. 2A and 2B.

Figure 4:
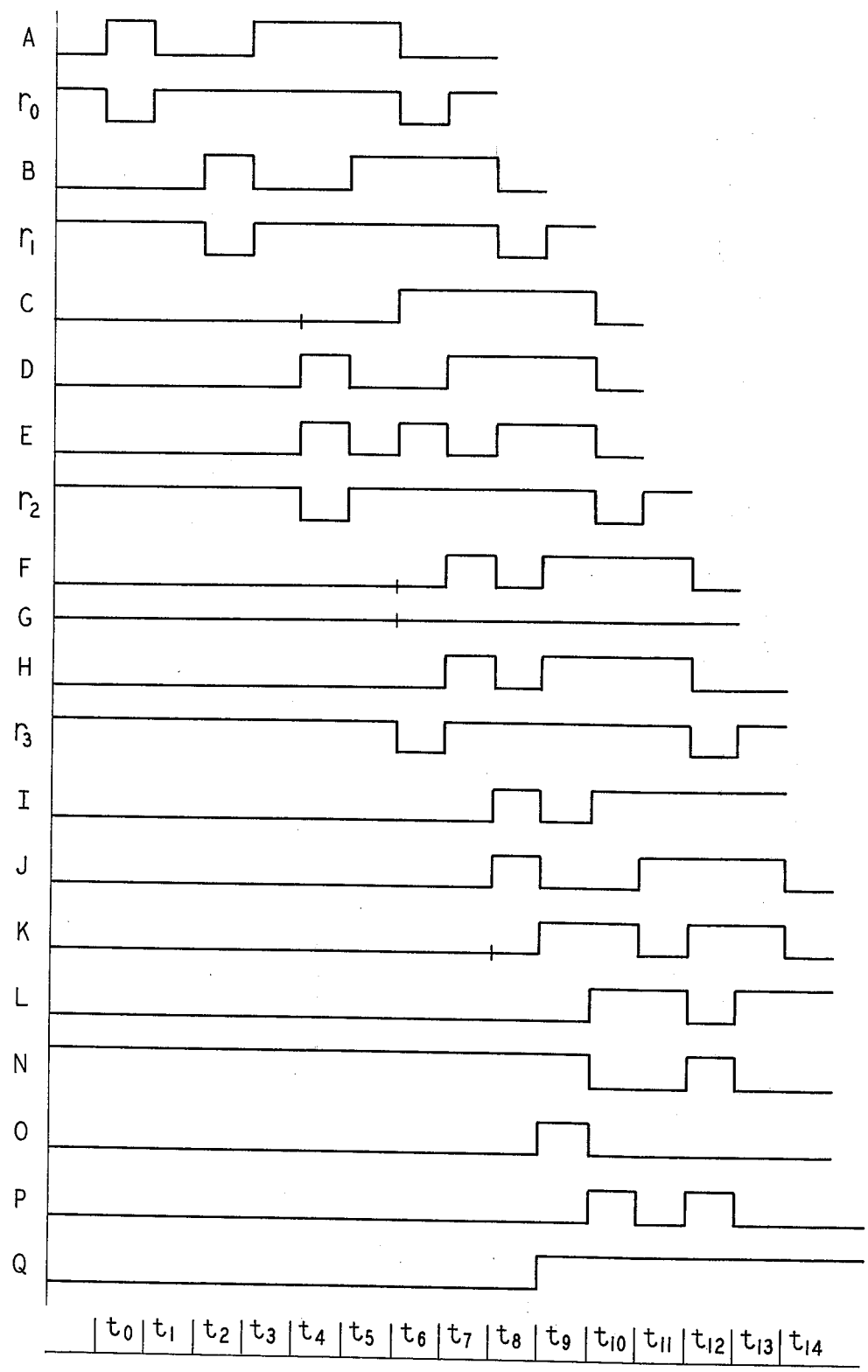
FIG. 4 shows a timing diagram for the illustrative circuit of FIG. 3.

FIG. 3 shows a multiplier in accordance with the present invention for forming the correct truncated final product of the multiplication shown in FIG. 2A. FIG. 4 is a timing diagram for the circuit of FIG. 3.

With reference to FIG. 3, the data word, least significant bit (LSB) first, is applied to input lead 300 and shifted through shift register 301. The coefficient word is applied, LSB first, to input lead 302. Each of the bits of the coefficient word, however, must be stored at a stage of the multiplier in order to be available to generate the required partial product terms involving subsequent data bits. In particular, the LSB of the coefficient word must be stored at the input (topmost in FIG. 3) stage and the MSB of the coefficient word at the last stage of the multiplier. The circuit of FIG. 3 accomplishes the coefficient bit storage task by gating the appropriate coefficient bit to a flip-flop in the stage with which the bit is associated. For example, the LSB of the coefficient word appears at the output of flip-flop 303 at the same time a logic 0, the truncation signal, is applied to flip-flop 304. Consequently, the LSB is gated, by means of AND gate 305, with a logic 1 from inverter 306. The output from AND gate 305 is applied, via OR gate 307, to flip-flop 308. During the succeeding interval, a 1 is applied to flip-flop 304. This 1 enables AND gate 309 such that the contents of flip-flop 308 are reapplied to it as often as required. Other coefficient bits are stored in similar fashion as the $r_i$ waveform assumes the 0 state at the ith stage.

The letter designations on the waveforms illustrated in FIG. 4 correspond to the letter designations at various points in the circuit of FIG. 3. High levels in FIG. 4 indicate a logical 1 and low levels a logical 0.

Thus, the waveform A in FIG. 4 is applied to input lead 300 in FIG. 3. The waveform A beginning at $t = t_o$ is that corresponding to the data sequence of FIG. 2A, that is, 100111. As indicated in FIG. 4, time proceeds from left to right. Notice also, that the sequence applied at point A in FIG. 3 is the data sequence with a single bit of sign extension. The sign extension is performed in straightforward fashion prior to application of the data word to the multiplier circuit. The particular manner in which the sign bit of the data word is extended by one bit prior to application to the multiplier is considered to be a matter of design choice well within the skill of an ordinary worker in the art. The specific structure for extending the sign bit before multiplication therefore forms no part of the present invention as claimed.

The data sequence appearing at point B (as well as B' and B'') in FIG. 3 is the sequence applied at point A delayed two input data clock intervals by the first two stages of register 301. Notice that during time interval $t_2$, the signal at B'' and the $r_1$ signal are ANDed by AND gate 311. The ANDing of $r_1$ and the LSB of the data sequence results in the truncation of the lowest-order partial product term in the multiplication illustrated in FIG. 2A. The waveform at C from time $t_3$ through time $t_8$ represents the digits of the partial product row (also labelled C) in FIG. 4. These digits are formed by the ANDing of the (stored) LSB of the coefficient word and the successive data word digits and summing with any carry bits in adder 390. The carry bits are temporarily stored in flip-flop 391 for application to adder 390. The output of adder 390 normally passes by way of AND gate 311, OR gate 392 and delay flip-flop 314 to point C. During the interval $t_8$, however, the truncation signal $r_1$ assumes a logic level of 0, which enables AND gate 312 via inverter 313 to cause the final 1 in the partial product row C in FIG. 2A to be extended one bit; that is, the bit in flip-flop 314 at time $t_8$ is reapplied to that flip-flop during time $t_9$. The output of adder 315 is the sum of the waveforms C and D and a zero from the carry flip-flop, which was cleared by the carry clear signal from register stage 316. The carry clear signal is the signal $r_1$ delayed one interval. Waveform E illustrates the sum with the final carry bit gated to 0 via AND gate 317. Thus, the final bit of the carry signal resulting from the addition of rows B", C and D in FIG. 2A is deleted. Again, however, the immediately preceding bit (stored in the associated delay flip-flop 394) is reapplied to the output at F.

The waveform at F shows the truncation of the lowest-order bit and the extension of the highest-order bit at the output of the second stage of multiplication. Partial product row E, F in FIG. 2A illustrates the extension of the leftmost bit in that row. Adder 330 sums the signals at F and G as well as any carry signals from flip-flop 333 not cleared by the action of the control signal in register 331 acting through AND gate 332. As seen from FIG. 2A, there are no carry signals which are cleared at the third stage of multiplication. Waveform I illustrates the truncation and sign extension effected at the third stage. Adder 334 sums the output of the third stage of multiplication, characterized by waveform I, with the data word, appropriately delayed, appearing at point J in FIG. 3. The output of the final stage of multiplication is the waveform K. Again, the signal $L_{35}$ delayed by register 370 gates the last carry signal to 0 as illustrated in FIG. 2A.

In addition to the four stages for generating the truncated product of the four-bit coefficient word and the data word illustrated in FIG. 2A, FIG. 3 includes a stage labelled "2's c". The 2's c stage generates the 2's complement of the final truncated product appearing at point L in the circuit of FIG. 3 when the data word is a negative number. Specifically, the SB of the coefficient word is entered into flip-flop 318 (when $r_4$ is negative the signal entered into flip-flop 318 is a 1). If the SB is 0, indicating a positive operand, the output from the final stage of multiplication is gated to the output terminal via AND gate 319, OR gate 321 and flip-flop 322. If the bit in flip-flop 318 is a 1, however, the final product must be converted to the 2's complement representation. This is accomplished by inverting the product and adding 1 to the LSB of the inverted version. Signal $r_4$, inverted by NAND gate 336 (waveform O) provides the 1 and inverter 324 provides the inversion of the output at L. Adder 325 adds the 1 to the LSB of the waveform at N. The 1 in flip-flop 318 gates the 2's complemented product, P, to the output lead 323 by means of AND gate 320, OR gate 321 and flip-flop 322. As indicated above, FIG. 2A illustrates, the multiplication of a negative data word by a positive coefficient word. FIG. 2B shows the formation of the correct 2's complement product of a negative data word and a negative coefficient word. As in the case of the multiplication shown in FIG. 2A, the letter designations in FIG. 2B correspond to points, similarly designated, in the circuit of FIG. 3.

The circuit of FIG. 3 is arranged to produce the correct final product of an $n$-bit data word having a single bit of sign extension by a 4-bit coefficient word. It is obvious from the discussion above that a multiplier for generating the final product of an m-bit coefficient word comprises $m+1$ stages, the first $m$ stages being identical to the topmost and succeeding three stages of the multiplier of FIG. 3 and the final stage being identical to the 2's complementer stage of the multiplier of FIG. 3.

What is claimed is:

1. Apparatus for generating the product of an ordered n-bit signed binary data word and an $m$-bit signed multiplier word, $m \geq 2$, said $n$-bit word including a single repetition of the data word sign in the most significant bit position, comprising
   A. $m$ substantially identical stages each comprising
      1. means for forming the bitwise product of one bit of said multiplier word and each bit of said data word,
      2. means for forming successive partial sums of said bitwise products and partial sums of equal significance generated at preceding stages,
      3. means for periodically blanking the one of said partial sums having lowest significance, and
      4. means for replacing said blanked significance sum bit with a duplicate of the most significant bit to effect sign extension of the most significant bit, and
   B. means for applying input partial sums generated at stage $i$ to stage $i+1$ for $i = 1, 2, \ldots, m$, said input partial sums applied at stage 1 being uniformly 0.

2. Apparatus according to claim 1 wherein said means for forming bitwise products comprises means for storing a respective one of said bits of said multiplier word, a 2-input AND gate, and means for applying said stored one of said bits and each of said data word bits in sequence to said inputs of said AND gate.

3. Apparatus according to claim 1 further comprising means for forming the 2's complement of the output of the $m^{th}$ stage whenever the sign of said data word is negative.

4. Apparatus according to claim 1 further comprising control means for generating a first control signal during the interval corresponding to the application to said apparatus of the third data word bit and wherein said means for periodically blanking at said first stage comprises means responsive to said first control signal for gating the LSB of the final product to 0.

* * * * *